United States Patent
Ali-Santosa (12)

(10) Patent No.: US 6,583,788 B1
(45) Date of Patent: Jun. 24, 2003

(54) EFFICIENTLY RENDERING LINE SEGMENTS ON A COMPUTER DISPLAY

(75) Inventor: Gunawan Ali-Santosa, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 360 days.

(21) Appl. No.: 09/588,635

(22) Filed: Jun. 6, 2000

(51) Int. Cl.[7] .............................................. G06T 11/20
(52) U.S. Cl. ...................... 345/443; 345/418; 345/467; 345/468; 345/586
(58) Field of Search ................................ 345/418–421, 345/428, 468, 440–443, 467–470, 581–583, 586–589, 606, 614, 619, 629, 641, 643, 644, 424, 427; 382/202–204, 254, 258

(56) References Cited

U.S. PATENT DOCUMENTS

| | | | | |
|---|---|---|---|---|
| 4,808,988 A | * | 2/1989 | Burke et al. | 340/744 |
| 5,333,250 A | * | 7/1994 | Staley et al. | 345/443 |
| 5,519,822 A | * | 5/1996 | Barkans et al. | 345/443 |
| 5,581,680 A | * | 12/1996 | Sfarti et al. | 345/443 |
| 5,646,691 A | * | 7/1997 | Yokoyama | 348/416 |
| 5,790,126 A | * | 8/1998 | Ballard et al. | 345/468 |
| 6,088,041 A | * | 7/2000 | Ballard et al. | 345/467 |
| 6,175,372 B1 | * | 1/2001 | Ballard et al. | 345/470 |

* cited by examiner

*Primary Examiner*—Matthew C. Bella
*Assistant Examiner*—Wesner Sajous
(74) *Attorney, Agent, or Firm*—Thelen Reid & Priest LLP; Marc S. Hanish

(57) ABSTRACT

A method for rendering a line segment extending in the positive-x direction and positive-y direction on a computer display given a starting point and an ending point, the starting point having the form $(x_s, y_s)$ and the ending point having the form $(x_e, y_e)$. In this method, $\Delta x$ and $\Delta y$ are computed using the formula $\Delta x = |x_e - x_s|$ and $\Delta y = |y_e - y_s|$, respectively. Then $dt(0) = (y_f * \Delta x) - (x_f * \Delta y)$ is computed, where $x_f$ is the fractional portion of $x_s$ and $y_f$ is the fractional portion of $y_s$, which allows for more precision. If the line segment extends in the postive-x and positive-y directions, then for each column n containing a portion of said line segment the process: plots said current pixel if $dt(n) \leq 0.5 * \Delta x$ and plotting the pixel above said current pixel if $dt(n) > 0.5 * \Delta x$; moves said current pixel to the right one pixel if $dt(n) \leq 0.5 * \Delta x$ and moves said pixel to the right and up one pixel if $dt(n) > 0.5 * \Delta x$; and corrects $dt(n)$ by computing $dt(n) = dt(n) - \Delta x$ if $dt(n) > 0.5 * \Delta x$. After all of these computations have been performed, the process may iterate to the next column by computing $dt(n+1) = dt(n) + \Delta y$. This method greatly reduces the number of calculations required by the prior art methods, thus producing a faster and more efficient process by which to draw line segments on a computer display.

25 Claims, 13 Drawing Sheets

EFFICIENTLY RENDERING LINE SEGMENTS ON A COMPUTER DISPLAY

BACKGROUND OF THE INVENTION

1. Field of the Invention

The present invention relates to computer displays. More specifically, the present invention relates to the efficient rendering of line segments on a computer display.

2. The Background

A computer display is made up of rows and columns of pixels. Each pixel may be very small. However, computer display technology has not yet advanced to the point where the pixels are small enough to avoid several limitations encountered when graphics are viewed by the human eye.

Line segments are represented as mathematical equations. Each segment will have a starting point, and ending point, and a slope. While some line segments may be relatively easy to draw on a computer display, such as precisely horizontal or vertical lines, most lines require some degree of approximation in choosing which pixels to illuminate in order to best represent the line segment to a viewer.

FIG. 1 is a diagram illustrating a line segment overlaid on a group of pixels. As can be seen, decisions must be made as to which pixels should be illuminated. For example, in column 2, a decision must be made between pixel 10 and pixel 12.

A common method for determining which pixels to illuminate to best represent a line segment is Bresenhan's line algorithm. In Bresenham's approach, for lines with slopes between 0 and 1, pixel positions along a line segment are determined by sampling the line in one-pixel increments. Therefore, the process starts at the starting point 14 and steps to each successive column. At each column, the pixel is chosen whose y value is closest to the line segment.

Starting from the left end-point $(x_0,y_0)$ of a given line, the process steps to each successive column (x position) and illuminates the pixel whose scan-line y-value is closest to the line segment. FIG. 2 is a diagram illustrating the kth step in this process. Assuming that the pixel at $(x_k,y_k)$ is to be displayed, the process needs to determine which pixel to plot in column $x_{k+1}$. The choices are the pixels at positions $(X_k+1,Y_k)$ and $(x_k+1, y_k+1)$.

At sampling position $x_k+1$, the vertical pixel separations from the mathematical line path may be termed $d_1$ and $d_2$. The y coordinate on the mathematical line segment at pixel column position $x_k+1$ is calculated as $$y=m(x_k+1)+b$$

where m=dy/dx
Then $$d_1=y-y_k$$

$$d_1=m(x_k+1)+b-y_k$$

$$d_2=(y_k+1)-y$$

$$d_2=y_k+1-m(x_k+1)-b$$

The difference between these two separations is $$d_1-d_2=2m(x_k+1)-2y_k+2b-1$$

The decision parameter $p_k$ for the kth step in the line process may be determined by rearranging the equations so that they only involve integer calculations. This may be accomplished by substituting $m=\Delta y/\Delta x$, where $\Delta y$ and $\Delta x$ are the vertical and horizontal separations of the endpoint positions, and defining:

$$p_k=\Delta x(d_1-d_2)$$

$$p_k=2\Delta y \cdot x_k-2/\Delta x \cdot y_k+c$$

The sign of $p_k$ is the same as the sign of $d_1-d_2$, since in the present case $\Delta x >0$. Parameter c is constant and has the value $2\Delta y+\Delta x$ (2b−1), which is independent of pixel position and will be eliminated in the recursive calculations for $p_k$. If the pixel at $y_k$ is closer to the line path than the pixel at $y_k+1$ (that is, $d_1<d_2$), then decision parameter $p_k$ is negative. In that case, the lower pixel is illuminated, otherwise the upper pixel is illuminated.

Coordinate changes along the line occur in unit steps in either the x or y directions. Therefore, the values of successive decision parameters can be obtained using incremental integer calculations. At step k+1, the decision parameter is evaluated as $$P_{k+1}=p_k+2\Delta y \cdot X_{k+1}-2\Delta x \cdot y_{k+1}+C$$

Subtracting $p_k=2\Delta y \cdot x_k-2/\Delta x \cdot y_k+C$ from the preceding equation, we have $$P_{k+1}-p_k=2\Delta y(x_{k+1}-x_k)-2\Delta x(y_{k+1}+Y_k)$$

But $x_{k+1}=x_k+1$, so that $$P_{k+1}=p_k+2\Delta y-2\Delta x(y_{k+1}+y_k)$$

where the term $Y_{k+1}+Y_k$ is either 0 or 1, depending on the sign of parameter $p_k$.

This recursive calculation of decision parameters is performed at each integer x position, starting at the left coordinate endpoint of the line. The first parameter, $p_0$, is evaluated at the starting pixel position $(x_0, y_0)$ and with m evaluated as $\Delta y/\Delta x$:

$$p_0+2\Delta y-\Delta x$$

Bresenham's method may be summarized as follows (for slope value between −1 and 1):

1. Begin with starting point $(x_0, y_0)$
2. calculate the following constants:
   $\Delta x$–the change in x over the entire line segment
   $\Delta y$–the change in y over the entire line segment
   $2\Delta y$
   $2\Delta y-2\Delta x$
3. Calculate the starting value for the decision parameter (p) as $$p_0 2\Delta y-\Delta x$$

4. At each $x_k$ along the line segment, starting at k=0, perform the following test: if $p_k<0$, the next point to plot is $(x_k+1, Y_k)$ and $$p_{k+1}=p_k+2\Delta y$$

Otherwise, the next point to plot is $(x_k+1, y_k+1)$ and $$p_{k+1}=p_k+2\Delta y-2\Delta x$$

5. Repeat step 4 for each column until the ending point is reached."

In recent years, there has been movement away from powerful mainframe computers to smaller, cheaper, less powerful processors, such as those that may be contained in set-top boxes and hand-held devices. The computation of constants requires a lot of computing power lest the speed of the line drawing suffer. The problem, therefore, with using Bresenham's method for drawing lines is that it requires the calculation of four different constants. What is needed is a solution for approximating line segments which can be performed with less calculations yet would yield similar results.

SUMMARY OF THE INVENTION

A method for rendering a line segment extending in the positive-x direction and positively direction on a computer display given a starting point and an ending point, the starting point having the form $(x_s, y_s)$ and the ending point having the form $(x_e, y_e)$. In this method, $\Delta x$ and $\Delta y$ are computed using the formula $\Delta x=|x_e-x_s|$ and $\Delta y=|y_e-y_s|$, respectively. Then $dt(0)=(y_f*\Delta x)-(x_f*\Delta y)$ is computed, where $x_f$ is the fractional portion of $x_s$ and $y_f$ is the fractional portion of $y_s$, which allows for more precision. If the line segment extends in the postive-x and positive-y directions, then for each column n containing a portion of said line segment the process: plots said current pixel if $dt(n)<=0.5*\Delta x$ and plotting the pixel above said current pixel if $dt(n)>0.5*\Delta x$; moves said current pixel to the right one pixel if $dt(n)<=0.5*\Delta x$ and moves said pixel to the right and up one pixel if $dt(n)>0.5*\Delta x$; and corrects $dt(n)$ by computing $dt(n)=dt(n)-\Delta x$ if $dt(n)>0.5*\Delta x$. After all of these computations have been performed, the process may iterate to the next column by computing $dt(n+1)=dt(n)+\Delta y$. This method greatly reduces the number of calculations required by the prior art methods, thus producing a faster and more efficient process by which to draw line segments on a computer display.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after review of this disclosure.

In accordance with a presently preferred embodiment of the present invention, the components, processes and/or data structures are implemented using software. Different implementations may be used and may include other types of programming languages, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Figure 1:
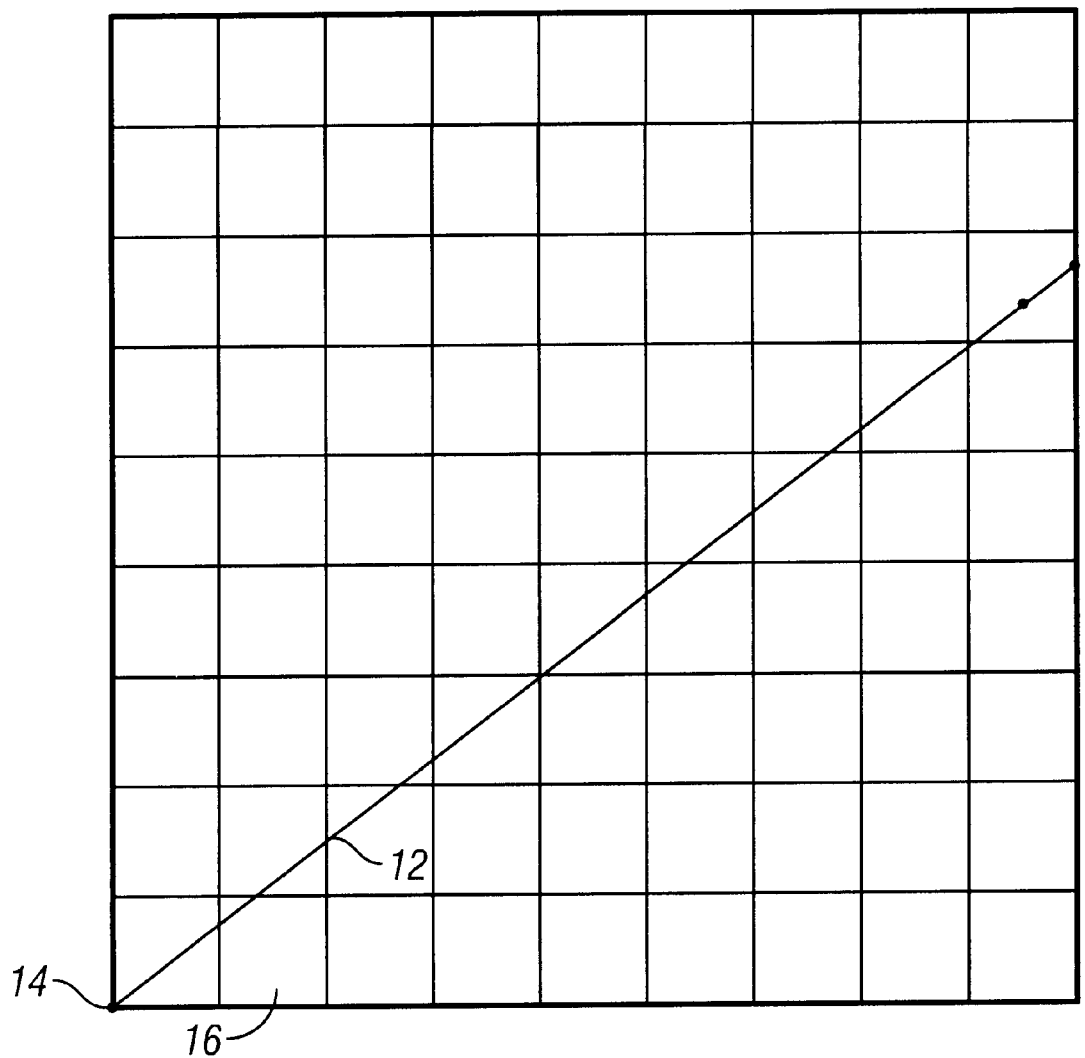
FIG. 1 is a diagram illustrating a line segment overlaid on a group of pixels.
Figure 2:
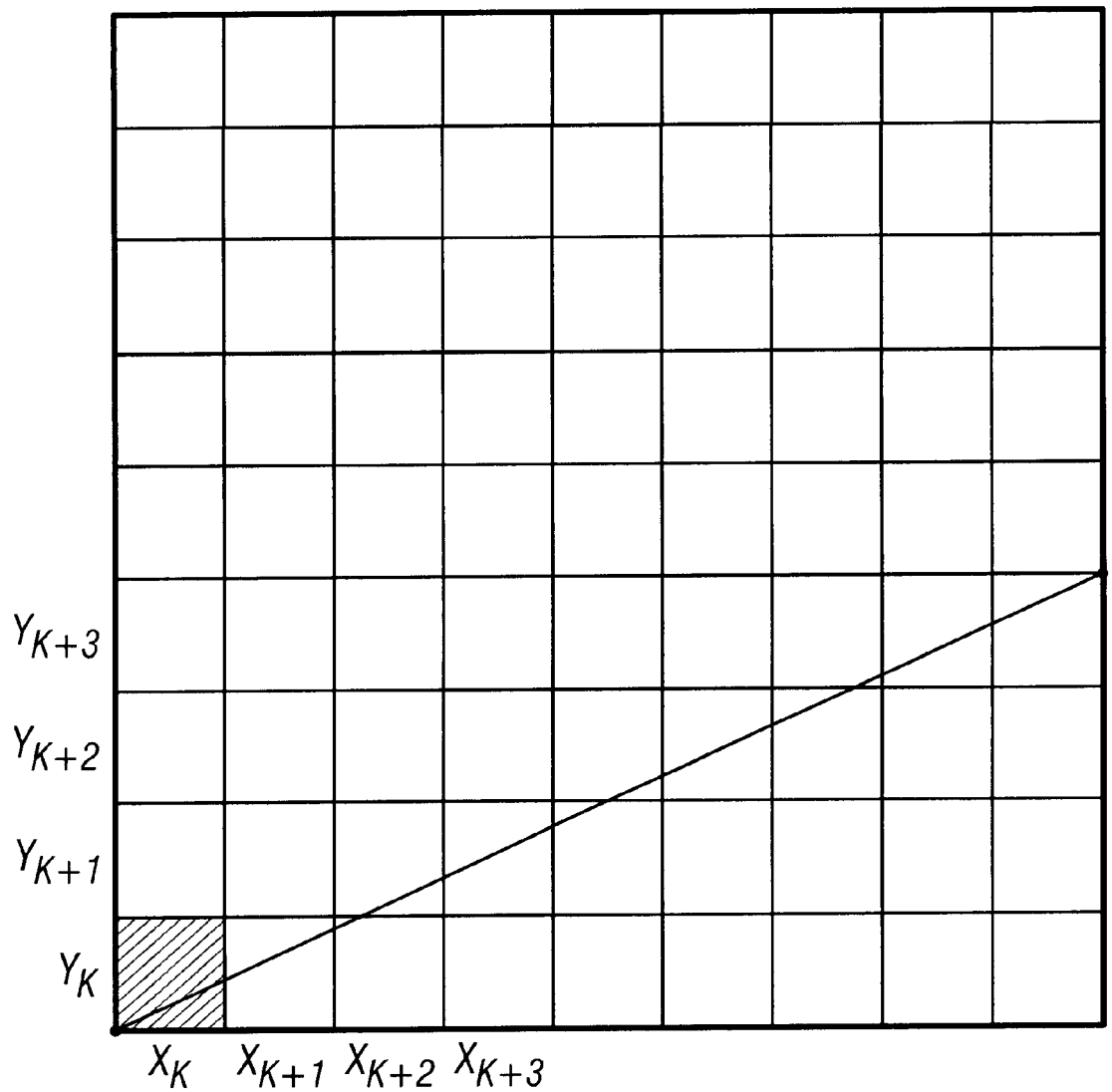
FIG. 2 is a diagram illustrating the kth step in the Bresenham algorithm.
Figure 3:
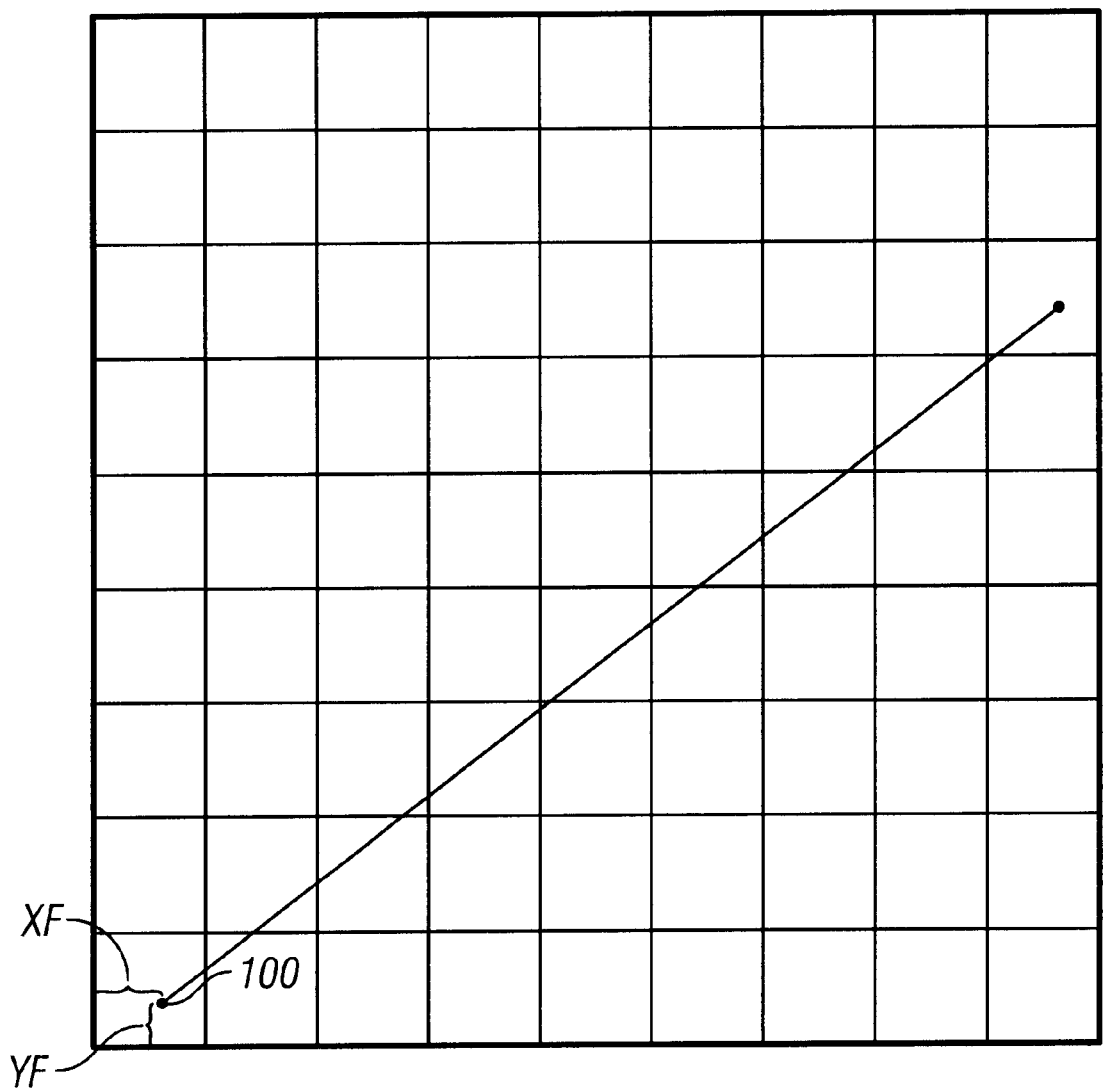
FIG. 3 is a diagram illustrating a line segment having coordinates with fractional components on a computer display.

In the present invention, a line segment may be approximated using fewer and less expensive calculations than called for by Bresenham. FIG. 3 is a diagram illustrating a line segment with coordinates having fractional components on a computer display. An origin point 100 may be chosen. The values $x_f$ and $y_f$ represent the horizontal and vertical distances (respectively) between the origin point of the actual line and a corner of the pixel in which the origin is located. Different corners are used depending upon the direction of the line. In a presently preferred embodiment of the present invention, the corner chosen is the one opposite the direction of the line. In FIG. 2, the lower left-hand corner is chosen because the line progresses in the positive horizontal and positive vertical direction. Rather than compute this distance using the equation:

$$y_k = m(x_k+1)+b$$

where $m=\Delta y/\Delta x$
which can be very expensive, the present invention solves for $y_i$ directly by solving the equation:

$$y_i = y_f - x_f * m$$

This equation may be rewritten as:

$$y_i = y_f - x_f*(\Delta y/\Delta x).$$

However, one problem that may be encountered if one attempts to compute the value for this equation is that the division computation ($\Delta y/\Delta x$) can be very expensive in a computer implementation. In a presently preferred embodiment of the present invention, this may be avoided by scaling the equation by $\Delta x$, giving:

$$y_i*\Delta x = (y_f*\Delta x) - (x_f*\Delta y).$$

Thus, the deviation term becomes $y_i*\Delta x$. There is still a overriding concern about reliability of the equation when $y_i > 0.5$ or $y_i < -0.5$. Therefore, the value of $(y_f*\Delta x)-(x_f*\Delta y)$ should be compared to $0.5*\Delta x$. If it is greater than $0.5*\Delta x$, the process should be repeated after moving vertically up one pixel. $0.5*\Delta x$ is a very simple computation to make in a computer as in binary numbers it results in simply shifting the value $\Delta x$ over to the right one bit.

The value $y_i*\Delta x$ maybe rewritten as simply dt. The present invention determines dt for each column (written as dt(0), dt(1), dt(2), etc.) and then compares the value to $0.5*\Delta x$. Rather than completely recompute dt for each column, the dt value may be determined by using the last dt value computed. The following equation is used:

$$dt(n+1) = dt(n) + \Delta y.$$

Thus, the process may simply iterate, computing dt for each column and comparing the result to $0.5*\Delta x$. If the result is bigger than $0.5*\Delta x$, the process moves up (or down for negative slope line segments) one pixel and shades it, otherwise the process simply shades the pixel on the same vertical level as the last one shaded.

One notable caveat is that if the result is indeed bigger than $0.5*\Delta x$, dt must be corrected before proceeding to the next iteration. This is done by subtracting $\Delta x$ from the current dt value.

Another caveat is that both $\Delta x$ and $\Delta y$ are absolute values, which simplifies computation, but requires a different process for the eight possible octant combinations in x-y plane.

Figure 4:
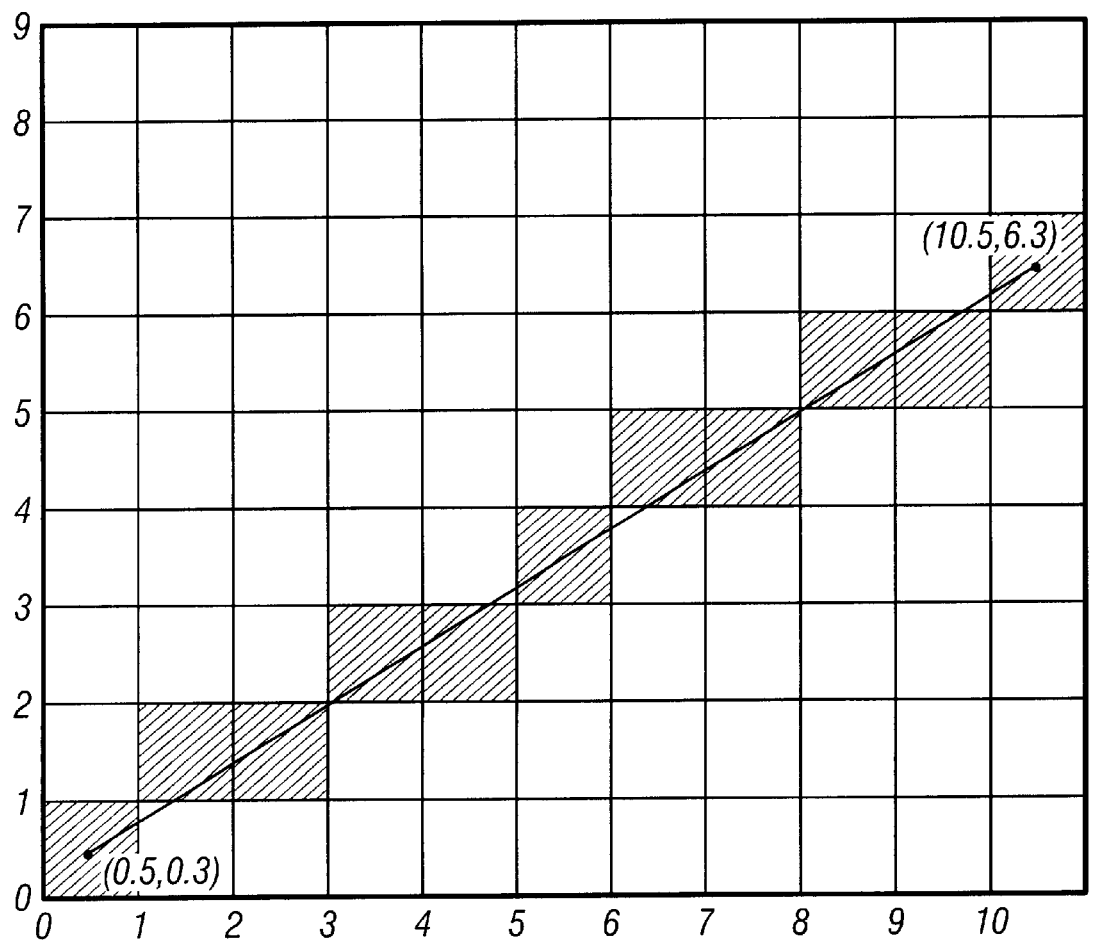
FIG. 4 is a diagram illustrating an example of the approximation of a line in accordance with a presently preferred embodiment of the present invention.

FIG. 4 is a diagram illustrating an example of the approximation of a line in accordance with a presently preferred embodiment of the present invention. The origin point is (0.5, 0.3) and the ending point is (10.5, 6.3), giving a slope of 0.6. $\Delta x$ then may be computed by subtracting 0.5 from 10.5 giving 10, with $\Delta y$ then being 6. Dt(0) may then be determined by using the equation $dt(0)=(y_f*\Delta x)-(x_f*\Delta y)=(0.3*10)-(0.5*6)=3-3=0$. Thus, since $dt(0)<0.5*\Delta x$, pixel (0,0) is shaded. Moving on to dt(1), this can be computed by adding $\Delta y$ to dt(0) giving 6, which is greater than $0.5*\Delta x$ (which is 5). Thus, the process steps up one pixel and shades pixel (1,1). Since the process stepped up a pixel, dt must be corrected before moving on, thus $\Delta x$ is subtracted from dt(1) making dt(1)=6−10=−4.

Continuing the process yields the following results:
dt(2)=−4+6=2, shade pixel (2,1).
dt(3)=2+6=8, bigger than 5, thus step up and shade pixel (3,2), correct dt(3) by subtracting 10, giving dt(3)=−2.
dt(4)=−2+6=4, shade pixel (4,2).
dt(5)=4+6=10, bigger than 5, thus step up and shade pixel (5,3), correct dt(5) by subtracting 10, giving dt(5)=−0.
*dt(6)=0+6=6, bigger than 5, thus step up and shade pixel (6,4), correct dt(6) by subtracting 10, giving dt($_6$)=−4.
dt(7)=−4+6=2, shade pixel (7,4).
dt(8)=2+6=8, bigger than 5, thus step up and shade pixel (8,5), correct dt(8) by subtracting 10, giving dt(7)=−2.
dt(9)=−2+6=4, shade pixel (9,5).
dt(10)=4 +6=10, bigger than 5, thus step up and shade pixel (10,6).

As can be seen, the present invention produces a fairly reliable approximation of the line segment while only requiring the direct computation of two constants.

Figure 5:
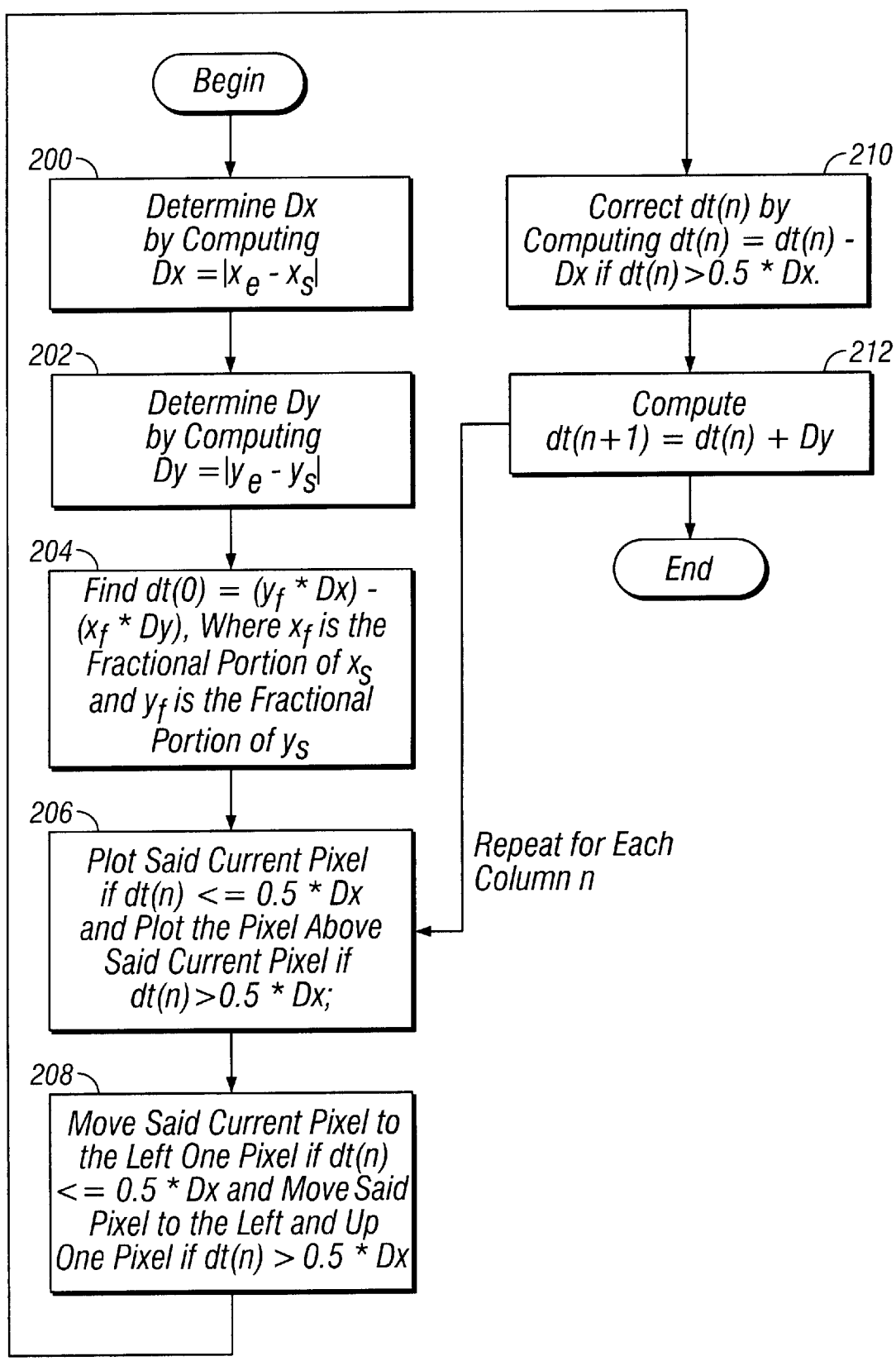
FIG. 5 is a flow diagram illustrating a method for rendering a line segment extending in the positive-x direction and positively direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 5 is a flow diagram illustrating a method for rendering a line segment extending in the positive-x direction and positive-y direction with an absolute value of its slope between 0 and 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 200, $\Delta x$ is determined by computing $\Delta x = |x_e - x_s|$. At 202, $\Delta y$ is determined by computing $\Delta y = |y_e - y_s|$.

At 204, the process finds dt(0) by solving $dt(0)=(y_f*\Delta x)-(x_f*\Delta y)$, where $x_f$ is the fractional portion of $x_s$ and $y_f$ is the fractional portion of $y_s$. Then the process iterates through each column, for each column n containing a portion of said line segment:

At 206, plotting said current pixel if $dt(n)<=0.5*\Delta x$ and plotting the pixel above said current pixel if $dt(n)>0.5*\Delta x$.

At 208, moving said current pixel to the right one pixel if $dt(n)<=0.5*\Delta x$ and moving said pixel to the right and up one pixel if $dt(n)>0.5*\Delta x$.

At 210 correcting dt(n) by computing dt(n)=dt(n)−Δx if dt(n)>0.5*Δx.

At 212, computing dt(n+1)=dt(n)+Δy.

Figure 6:
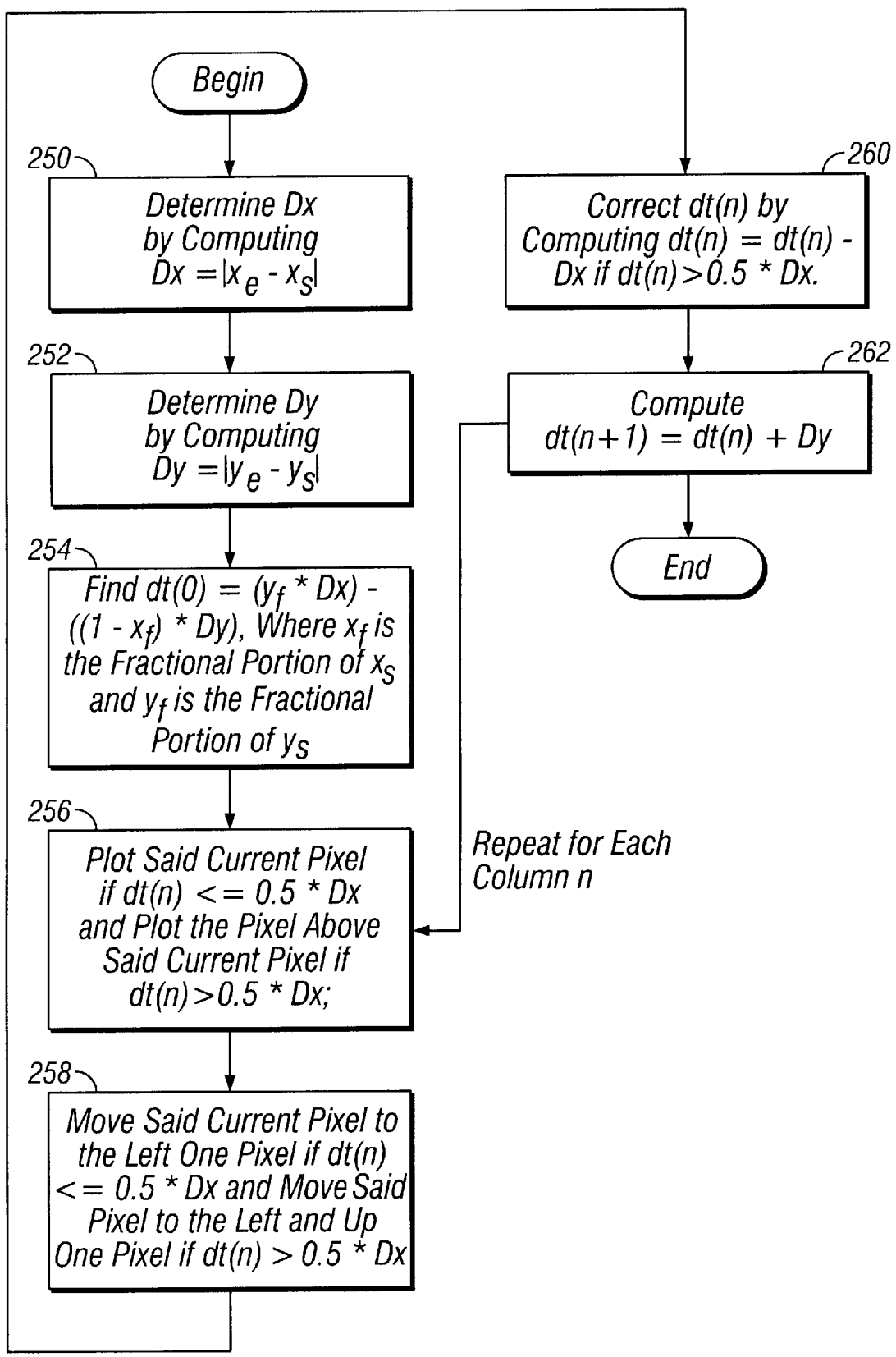
FIG. 6 is a flow diagram illustrating a method for rendering a line segment extending in the negative-x direction and positively direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 6 is a flow diagram illustrating a method for rendering a line segment extending in the negative-x direction and positive-y direction with an absolute value of its slope between 0 and 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 250, Δx is determined by computing Δx=|$x_e$−$x_s$|. At 252, Δy is determined by computing Δy=|$y_e$−$y_s$|.

At 254, the process finds dt(0) by solving dt(0)=($y_f$*Δx)−((1−$x_f$)*Δy), where $x_f$ is the fractional portion of $x_s$ and $y_f$ is the fractional portion of $y_s$. Then the process iterates through each column, for each column n containing a portion of said line segment:

At 256, plotting said current pixel if dt(n)<=0.5*Δx and plotting the pixel above said current pixel if dt(n)>0.5*Δx.

At 258, moving said current pixel to the left one pixel if dt(n)<=0.5*Δx and moving said pixel to the left and up one pixel if dt(n)>0.5* 66 x.

At 260 correcting dt(n) by computing dt(n)=dt(n)−Δx if dt(n)>0.5*Δx.

At 262, computing dt(n+1)=dt(n)+Δy.

Figure 7:
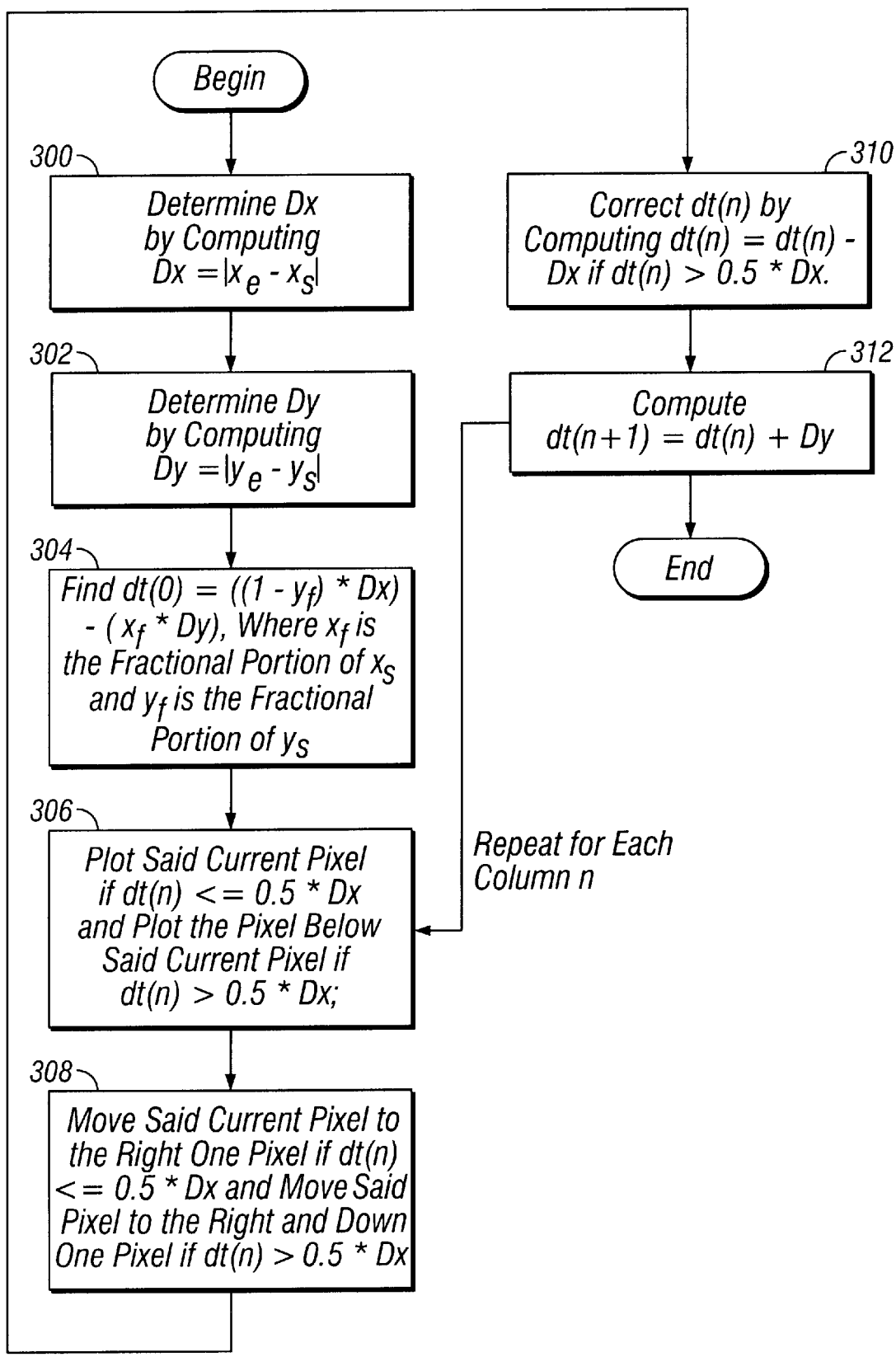
FIG. 7 is a flow diagram illustrating a method for rendering a line segment extending in the positive-x direction and negative-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 7 is a flow diagram illustrating a method for rendering a line segment extending in the positive-x direction and negatively direction with an absolute value of its slope between 0 and 1 on a computer display given a starting point and an ending point, the starting point having the form ($X_s$, $y_s$) and the ending point having the form ($x_e$, $y_e$), the computer display having a current pixel initially set to a pixel containing the starting point, in accordance with a presently preferred embodiment of the present invention. At 300, Δx is determined by computing Δx=$x_e$−|$x_s$|. At 302, Δy is determined by computing Δy=|$y_e$−$y_s$|.

At 304, the process finds dt(0) by solving dt(0)=((1−$y_f$)*Δx)−($x_f$*Δy), where $x_f$ is the fractional portion of $x_s$ and $y_f$ is the fractional portion of $y_s$. Then the process iterates through each column, for each column n containing a portion of said line segment:

At 306, plotting said current pixel if dt(n)<=0.5*Δx and plotting the pixel above said current pixel if dt(n)>0.5*Δx.

At 308, moving said current pixel to the right one pixel if dt(n)<=0.5*Δx and moving said pixel to the right and down one pixel if dt(n)>0.5*Δx.

At 310 correcting dt(n) by computing dt(n)=dt(n)−Δx if dt(n)>0.5*Δx.

At 312, computing dt(n+1)=dt(n)+Δy.

Figure 8:
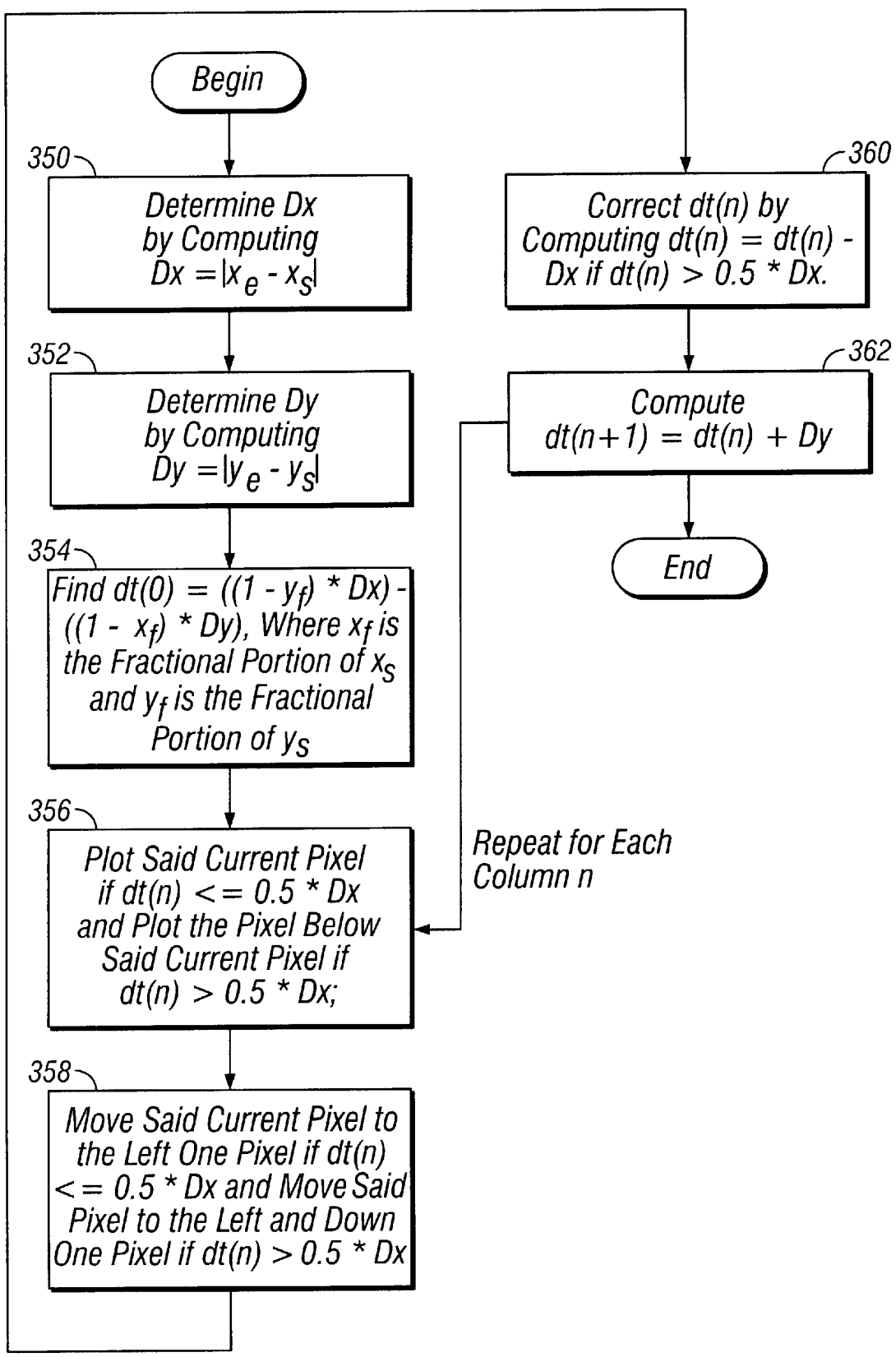
FIG. 8 is a flow diagram illustrating a method for rendering a line segment extending in the negative-x direction and negative-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 8 is a flow diagram illustrating a method for rendering a line segment extending in the negative-x direction and negative-y direction with an absolute value of its slope between 0 and 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 350, Δx is determined by computing Δx=|$x_e$−$x_s$|. At 352, Δy is determined by computing Δy=|$Y_e$−$y_s$|.

At 354, the process finds dt(0) by solving dt(0)=((1−$x_f$)*Δy)−((1−$y_f$)*Δx), where $x_f$ is the fractional portion of $x_s$ and $y_f$ is the fractional portion of $y_s$. Then the process iterates through each column, for each column n containing a portion of said line segment:

At 356, plotting said current pixel if dt(n)<=0.5*Δy and plotting the pixel below said current pixel if dt(n)>0.5*Δy.

At 358, moving said current pixel to the left one pixel if dt(n)<=0.5*Δy and moving said pixel to the left and down one pixel if dt(n)>0.5*Δy.

At 360 correcting dt(n) by computing dt(n)=dt(n)−Δy if dt(n)>0.5*Δy.

At 362, computing dt(n+1)=dt(n)+Δx.

For lines with an absolute value of their slope being greater than one, the process must be slightly modified to symmetrically correct for the angle of the line. Thus, rather than stepping through n columns, it must step through r rows. Additionally, minor alterations to the variables and equations must be performed.

Figure 9:
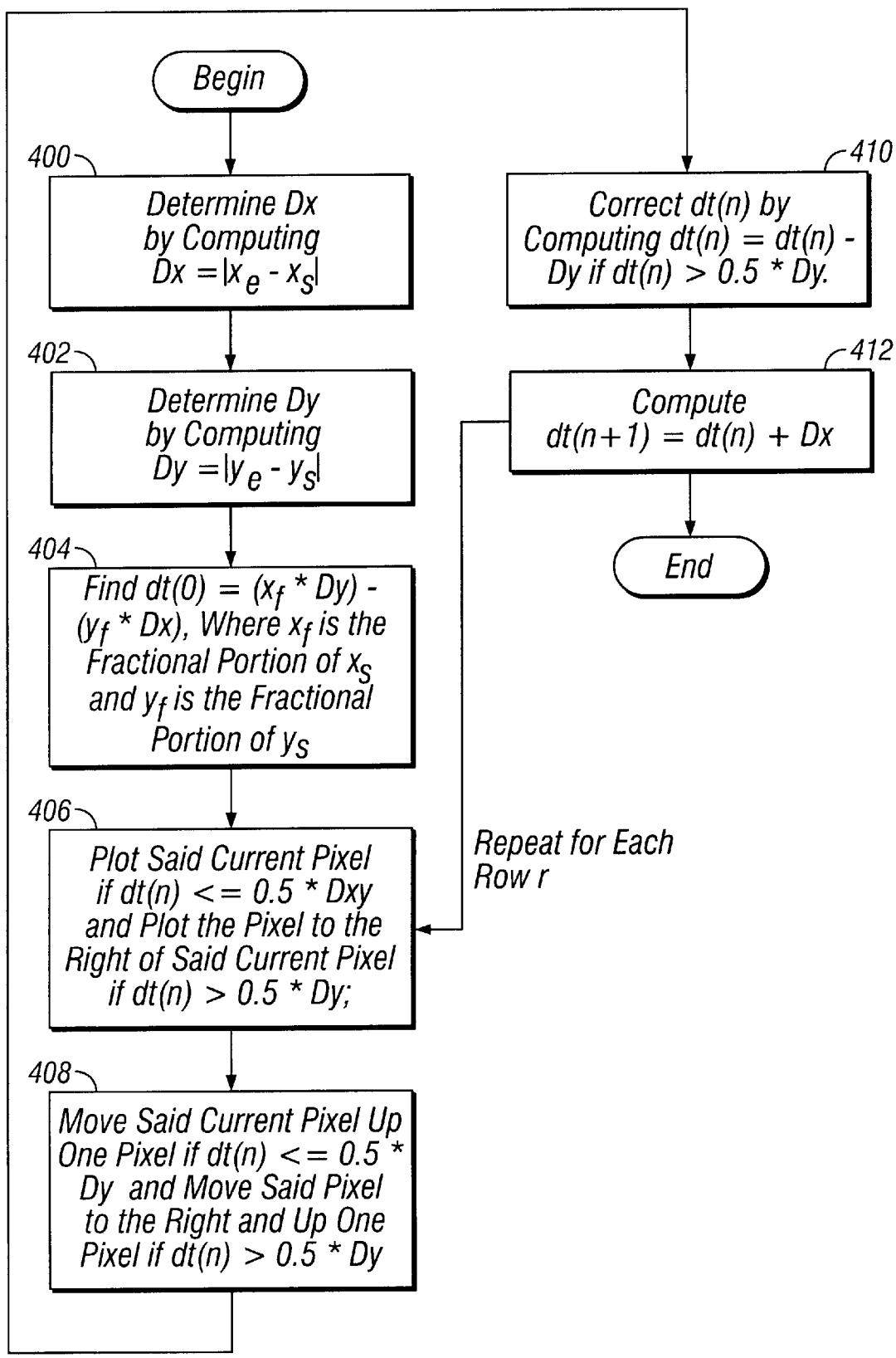
FIG. 9 is a flow diagram illustrating a method for rendering a line segment extending in the positive-x direction and positive-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 9 is a flow diagram illustrating a method for rendering a line segment extending in the positive-x direction and positively direction with an absolute value of its slope greater than 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 400, Δx is determined by computing Δx=|$x_s$−$x_s$|. At 402, Δy is determined by computing Δy=|$y_e$−$y_s$|.

At 404, the process finds dt(0) by solving dt(0)=($x_f$*Δy)−($y_f$*Δx), where $x_f$ is the fractional portion of $x_s$ and $y_f$ is the fractional portion of $y_s$. Then the process iterates through each row, for each row r containing a portion of said line segment:

At 406, plotting said current pixel if dt(n)<=0.5*Δy and plotting the pixel to the right of said current pixel if dt(n)>0.5*Δy.

At 408, moving said current pixel up one pixel if dt(n)<=0.5*Δy and moving said pixel to the right and up one pixel if dt(n)>0.5*Δy.

At 410 correcting dt(n) by computing dt(n)=dt(n)−Δy if dt(n)>0.5*Δy.

At 412, computing dt(n+1)=dt(n)+Δx.

Figure 10:
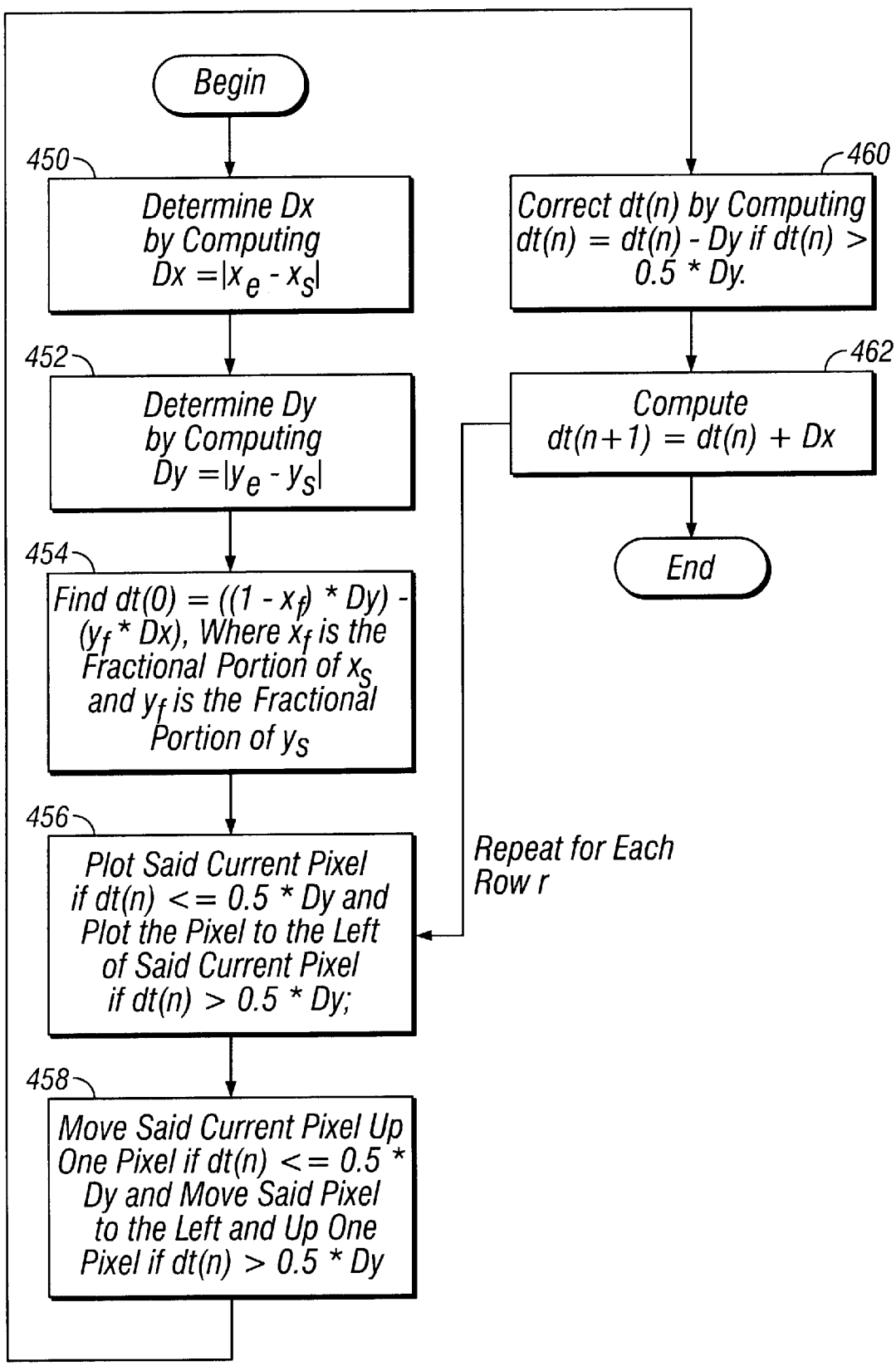
FIG. 10 is a flow diagram illustrating a method for rendering a line segment extending in the negative-x direction and positive-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 10 is a flow diagram illustrating a method for rendering a line segment extending in the negative-x direction and positive-y direction with an absolute value of its slope greater than 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 450, Δx is determined by computing Δx=|$x_e$−$x_s$51 . At 452, Δy is determined by computing Δy=|$y_e$−$y_s$|.

At 454, the process finds dt(0) by solving dt(0)=((1−$x_f$)*Δy)−($y_f$*Δx), where $x_f$ is the fractional portion of $x_s$ and $y_f$ is the fractional portion of $y_s$. Then the process iterates through each row, for each row r containing a portion of said line segment:

At 456, plotting said current pixel if dt(n)<=0.5*Δy and plotting the pixel to the left of said current pixel if dt(n)>0.5*Δy.

At 458, moving said current pixel up one pixel if dt(n)<=0.5*Δy and moving said pixel to the left and up one pixel if dt(n)>0.5*Δy.

At 460 correcting dt(n) by computing dt(n)=dt(n)−Δy if dt(n)>0.5*Δy.

At 462, computing dt(n+1)=dt(n)+Δx.

Figure 11:
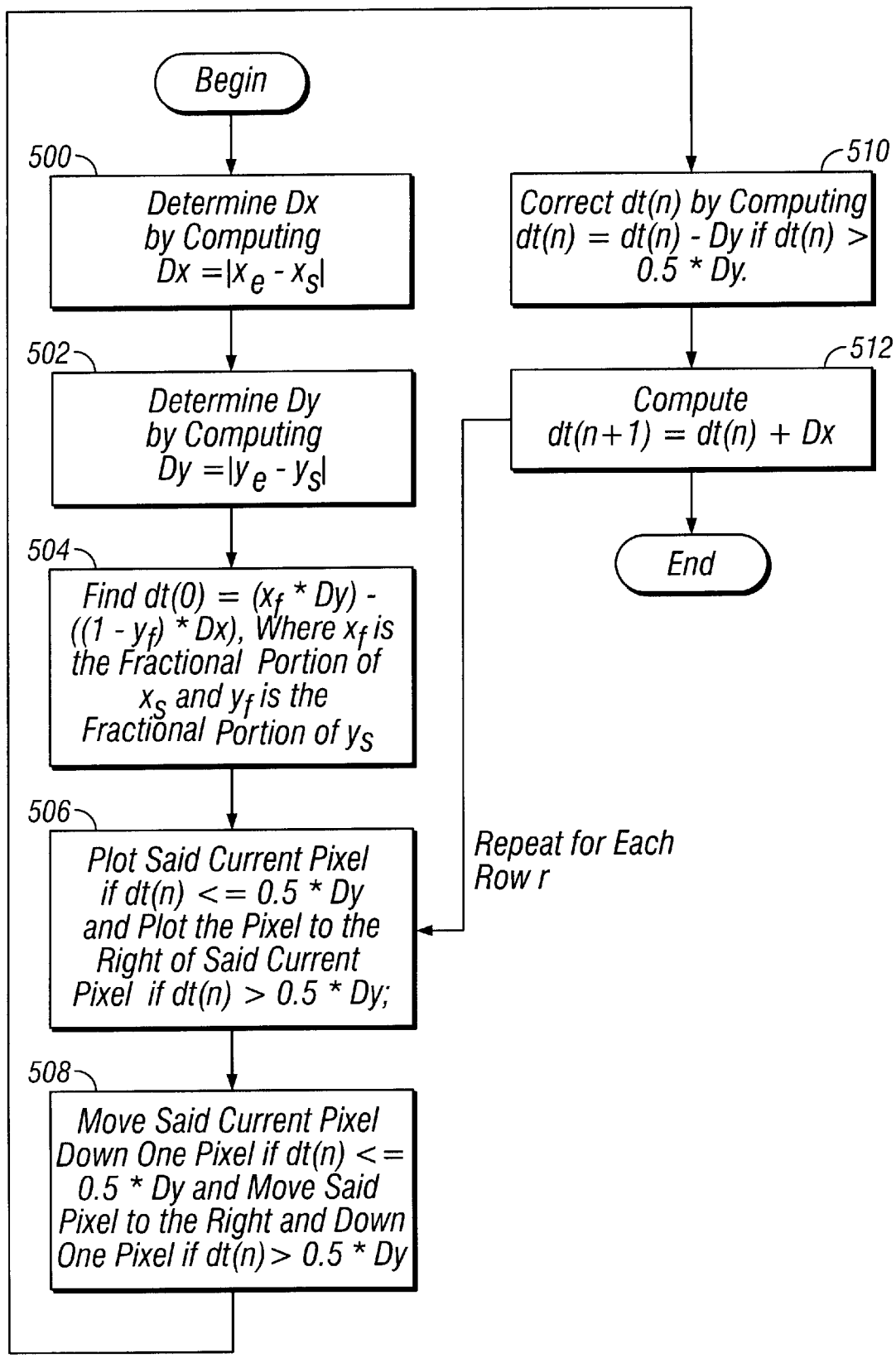
FIG. 11 is a flow diagram illustrating a method for rendering a line segment extending in the positive-x direction and negative-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 11 is a flow diagram illustrating a method for rendering a line segment extending in the positive-x direction and negatively direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. At 500, $\Delta x$ is determined by computing $\Delta x=|x_e-x_s|$. At 502, $\Delta y$ is determined by computing $\Delta y=|y_e-y_s|$.

At 504, the process finds dt(0) by solving $dt(0)=(x_f*\Delta y)-((1-y_f)*\Delta x)$, where $x_f$ is the fractional portion of $x_s$ and $y_f$ is the fractional portion of $y_s$. Then the process iterates through each row, for each row r containing a portion of said line segment:

At 504, plotting said current pixel if $dt(n)<=0.5*\Delta y$ and plotting the pixel to the right of said current pixel if $dt(n)>0.5*\Delta y$.

At 508, moving said current pixel down one pixel if $dt(n)>=0.5*\Delta y$ and moving said pixel to the right and down one pixel if $dt(n)>0.5*\Delta y$.

At 510 correcting dt(n) by computing $dt(n)=dt(n)-\Delta y$ if $dt(n)>0.5*\Delta y$.

At 512, computing $dt(n+1)=dt(n)+\Delta x$.

Figure 12:
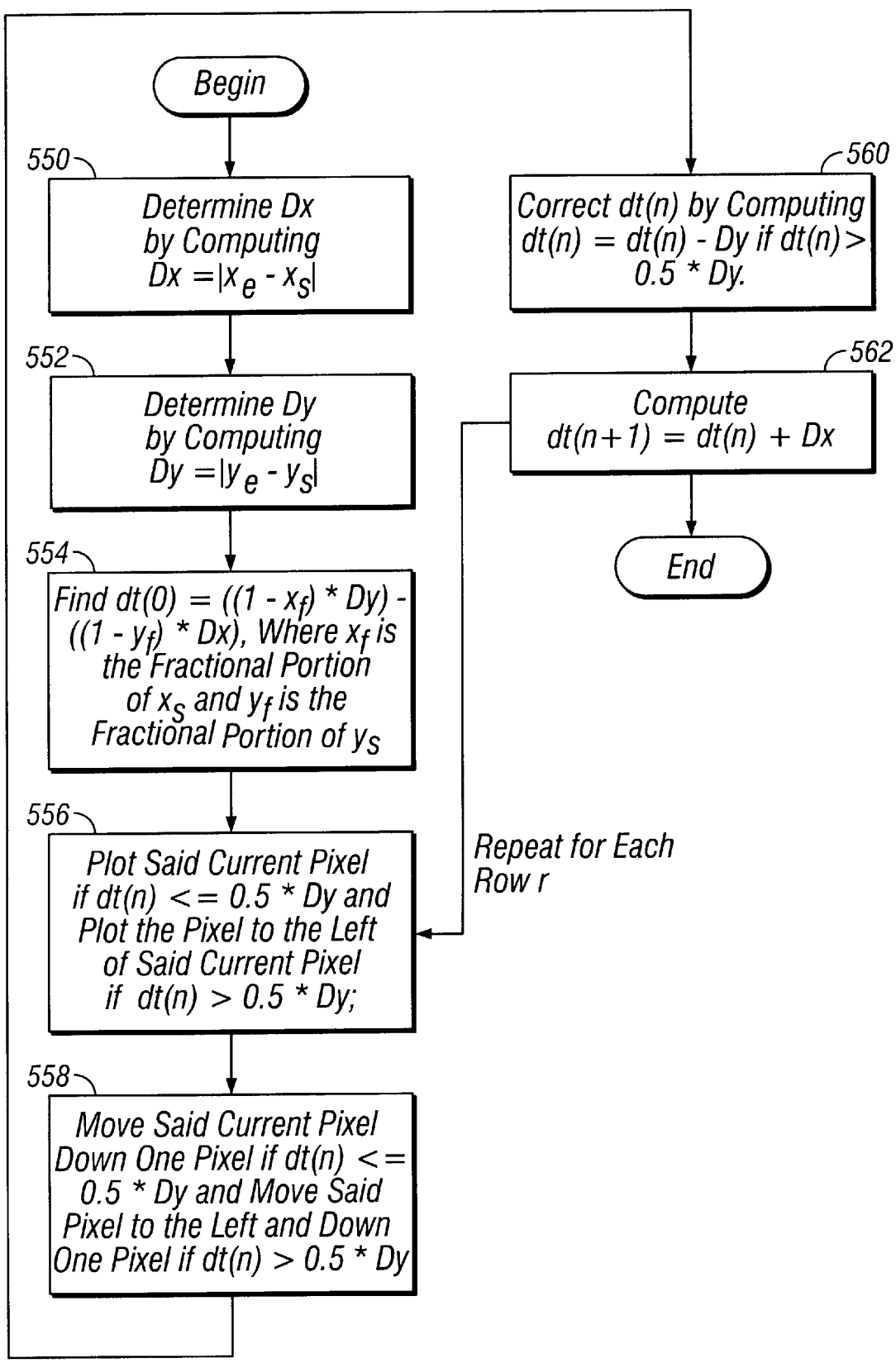
FIG. 12 is a flow diagram illustrating a method for rendering a line segment extending in the negative-x direction and negatively direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 12 is a flow diagram illustrating a method for rendering a line segment extending in the negative-x direction and negatively direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. At 550, $\Delta x$ is determined by computing $\Delta x=|x_e-x_s|$. At 552, $\Delta y$ is determined by computing $\Delta y=|y_e-y_s|$.

At 554, the process finds dt(0) by solving $dt(0)=((1-x_f)*\Delta y)-((1-y_f)*\Delta x)$, where $x_f$ is the fractional portion of $x_s$ and $y_f$ is the fractional portion of $y_s$. Then the process iterates through each row, for each row r containing a portion of said line segment:

At 556, plotting said current pixel if $dt(n)<=0.5*\Delta y$ and plotting the pixel to the left of said current pixel if $dt(n)>0.5*\Delta y$.

At 558, moving said current pixel down one pixel if $dt(n)<=0.5*\Delta y$ and moving said pixel to the left and down one pixel if $dt(n)>0.5*\Delta y$.

At 560 correcting dt(n) by computing $dt(n)=dt(n)-\Delta y$ if $dt(n)>0.5*\Delta y$.

At 562, computing $dt(n+1)=dt(n)+\Delta x$.

Figure 13:
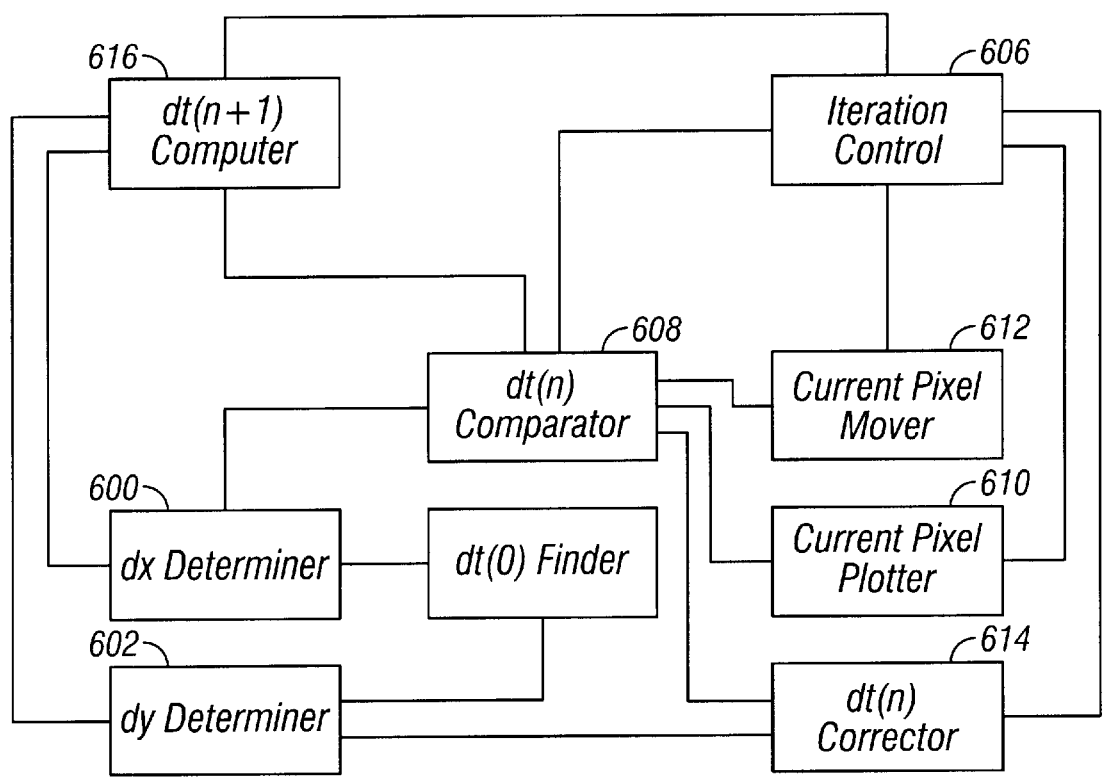
FIG. 13 is a block diagram illustrating an apparatus for rendering a line segment on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 13 is a block diagram illustrating an apparatus for rendering a line segment on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. A $\Delta x$ determiner 600 determines $\Delta x$ by computing $\Delta x=|x_e-x_s|$. A $\Delta y$ determiner 602 determines $\Delta y$ by computing $\Delta y=|y_e-y_s|$.

A dt(0) finder 404 coupled to said $\Delta x$ determiner 600 and said $\Delta y$ determiner 602 solves $dt(0)=((1-y_f)*\Delta x)-((1-x_f)*\Delta y)$, where x is the fractional portion of $x_s$ and $y_f$ is the fractional portion of $y_s$. An iteration control 606 iterates through each column (or row), for each column n (or row r) containing a portion of said line segment:

A dt(n) comparator 608 coupled to said $\Delta x$ determiner 600, said dt(0) finder 604, and said iteration control 606 compares dt(n) with $0.5*\Delta x$.

A current pixel plotter 610 coupled to said iteration control 606 and said dt(n) comparator 608 plots said current pixel if $dt(n)<=0.5*\Delta x$ and plots the pixel above said current pixel if $dt(n)>0.5*\Delta x$ (or other directions depending on the octant).

A current pixel mover 612 coupled to said iteration control 606 and said dt(n) comparator 608 moves said current pixel to the right one pixel if $dt(n)<=0.5*\Delta x$ (or other directions depending on the octant) and moves said pixel to the right (or other directions depending on the octant) and up (or other directions depending on the octant) one pixel if $dt(n)>0.5*\Delta x$.

A dt(n) corrector 614 coupled to said $\Delta y$ determiner 602, said iteration control 606 and said dt(n) comparator 608 computes $dt(n)=dt(n)-\Delta x$ if $dt(n)>0.5*\Delta x$.

A dt(n+1) computer 616 coupled to said iteration control 606, said dt(n) comparator 608 and said $\Delta y$ determiner 602 or $\Delta x$ determiner 600 computes $dt(n+1)=dt(n)+\Delta y$ (or $\Delta x$ depending on the octant).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for rendering a line segment extending in the positive-x direction and positive-y direction with an absolute value of its slope between 0 and 1 on a computer display given a starting point and an ending point, the starting point having the form $(x_s, y_s)$ and the ending point having the form $(x_e, y_e)$, $x_s, y_s, x_e, y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=(y_f*\Delta x)-(x_f*\Delta y)$, where $x_f$ is the fractional portion of $x_s$ and $y_f$ is the fractional portion of $y_s$;

for each column n containing a portion of said line segment:

plotting said current location if $dt(n)<=0.5*\Delta x$ and plotting a pixel above said current location if $dt(n)>0.5*\Delta x$;

moving said current location to the right one pixel if $dt(n)<=0.5*\Delta x$ and moving said current location to the right and up one pixel if $dt(n)>0.5*\Delta x$;

correcting dt(n) by computing $dt(n)=dt(n)-\Delta x$ if $dt(n)>0.5*\Delta x$; and computing $dt(n+1)=dt(n)+\Delta y$.

2. A method for rendering a line segment extending in the negative-x direction and positive-y direction with an absolute value of its slope between 0 and 1 on a computer display given a starting point and an ending point, the starting point having the form $(x_s, y_s)$ and the ending point having the form $(x_e, y_e)$, $x_s, y_s, x_e, y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=(y_f*\Delta x)-((1-x_f)*\Delta y)$, where $x_f$ is the fractional portion of $x_s$ and $y_f$ is the fractional portion of $y_s$;

for each column n containing a portion of said line segment:
- plotting said current location if $dt(n)<=0.5*\Delta x$ and plotting a pixel above said current location if $dt(n)>0.5*\Delta x$;
- moving said current location to the left one pixel if $dt(n)<=0.5*\Delta x$ and moving said current location to the left and up one pixel if $dt(n)>0.5*\Delta x$;
- correcting $dt(n)$ by computing $dt(n)=dt(n)-\Delta x$ if $dt(n)>0.5*\Delta x$; and
- computing $dt(n+1)=dt(n)+\Delta y$.

3. A method for rendering a line segment extending in the positive-x direction and negative-y direction with an absolute value of its slope between 0 and 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=((1y_f)*\Delta x)-(x_f*\Delta y)$, where $x_f$ is the fractional portion of $x_s$ and $y_f$ is the fractional portion of $y_s$;

for each column n containing a portion of said line segment:
- plotting said current location if $dt(n)<=0.5*\Delta x$ and plotting a pixel below said current location if $dt(n)>0.5*\Delta x$;
- moving said current location to the right one pixel if $dt(n)<=0.5*\Delta x$ and moving said current location to the right and down one pixel if $dt(n)>0.5*\Delta x$;
- correcting $dt(n)$ by computing $dt(n)=dt(n)-\Delta x$ if $dt(n)>0.5*\Delta x$; and
- computing $dt(n+1)=dt(n)+\Delta y$.

4. A method for rendering a line segment extending in the negative-x direction and negative-y direction with an absolute value of its slope between 0 and 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=((1-y_f)*\Delta x)-((1-x_f)*\Delta y)$, where $x_f$ is the fractional portion of $x_s$ and $y_f$ is the fractional portion of $y_s$;

for each column n containing a portion of said line segment:
- plotting said current location if $dt(n)<=0.5*\Delta x$ and plotting a pixel below said current location if $dt(n)>0.5*\Delta x$;
- moving said current location to the left one pixel if $dt(n)<=0.5*\Delta x$ and moving said current location to the left and down one pixel if $dt(n)>0.5*\Delta x$;
- correcting $dt(n)$ by computing $dt(n)=dt(n)-\Delta x$ if $dt(n)>0.5*\Delta x$; and
- computing $dt(n+1)=dt(n)+\Delta y$.

5. A method for rendering a line segment extending in the positive-x direction and positive-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=(x_f*\Delta y)-(y_f*\Delta x)$, where $x_f$ is the fractional portion of $X_s$ and $y_f$ is the fractional portion of $y_s$;

for each row r containing a portion of said line segment:
- plotting said current location if $dt(n)<=0.5\Delta y$ and plotting a pixel to the right of said current location if $dt(n)>0.5*\Delta y$;
- moving said current location up one pixel if $dt(n)<=0.5*\Delta y$ and moving said current location to the right and up one pixel if $dt(n)>0.5*\Delta y$; and
- correcting $dt(n)$ by computing $dt(n)=dt(n)-\Delta y$ if $dt(n)>0.5*\Delta y$; and
- computing $dt(n+1)=dt(n)+\Delta x$.

6. A method for rendering a line segment extending in the negative-x direction and positive-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=((1-x_f)*\Delta y)-(y_f*\Delta x)$, where $x_f$ is the fractional portion of $x_s$ and $y_f$ is the fractional portion of $y_s$;

for each row r containing a portion of said line segment:
- plotting said current location if $dt(n)<=0.5*\Delta y$ and plotting a pixel to the left of said current location if $dt(n)>0.5*\Delta y$;
- moving said current location up one pixel if $dt(n)<=0.5*\Delta y$ and moving said current location to the left and up one pixel if $dt(n)>0.5*\Delta y$;
- correcting $dt(n)$ by computing $dt(n)=dt(n)-\Delta y$ if $dt(n)>0.5*\Delta y$; and
- computing $dt(n+1)=dt(n)+\Delta x$.

7. A method for rendering a line segment extending in the positive-x direction and negative-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x=|x_e-x_s|$;

determining $\Delta y$ by computing $\Delta y=|y_e-y_s|$;

finding $dt(0)=(x_f*\Delta y)-((1-y_f)*\Delta x)$, where $x_f$ is the fractional portion of $x_s$ and $y_f$ is the fractional portion of $y_s$;

for each row r containing a portion of said line segment:
- plotting said current location if $dt(n)<=0.5*\Delta y$ and plotting a pixel to the right of said current location if $dt(n)>0.5*\Delta y$;
- moving said current location down one pixel if $dt(n)<=0.5*\Delta y$ and moving said current location to the right and down one pixel if $dt(n)>0.5*\Delta y$;
- correcting $dt(n)$ by computing $dt(n)=dt(n)-\Delta y$ if $dt(n)>0.5*\Delta y$; and
- computing $dt(n+1)=dt(n)+\Delta x$.

8. A method for rendering a line segment extending in the negative-x direction and negative-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = ((1-x_f)*\Delta y) - ((1-y_f)*\Delta x)$, where $x_f$ is the fractional portion of $x_s$ and $y_f$ is the fractional portion of $y_s$;

for each row r containing a portion of said line segment:
plotting said current location if $dt(n) <= 0.5*\Delta y$ and plotting a pixel to the left of said current location if $dt(n) > 0.5*\Delta y$;

moving said current location down one pixel if $dt(n) <= 0.5*\Delta y$ and moving said current location to the left and down one pixel if $dt(n) > 0.5*\Delta y$;

correcting $dt(n)$ by computing $dt(n) = dt(n) - \Delta y$ if $dt(n) > 0.5*\Delta y$; and computing $dt(n+1) = dt(n) + \Delta x$.

9. An apparatus for rendering a line segment on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current pixel initially set to a pixel containing the starting point, the apparatus including:

a $\Delta x$ determiner;

a $\Delta y$ determiner;

a $dt(0)$ finder coupled to said $\Delta x$ determiner wherein $dt(0)$ is determined by computing $dt(0) = ((1-x_f)*\Delta y) - ((1-y_f)*\Delta x)$ where $x_f$ is the fractional portion of $x_s$ and $y_f$ is the fractional portion of $y_s$; and said $\Delta y$ determiner;

an iteration control;

a $dt(n)$ comparator coupled to said iteration control, said $dt(0)$ finder, and said $\Delta x$ determiner;

a current pixel plotter coupled to said iteration control and said $dt(n)$ comparator wherein $dt(n)$ is determined by computing $dt(n) <= 0.5*\Delta y$ for plotting said current pixel, and for plotting the pixel above the current pixel $dt(n)$ is determined if $dt(n) > 0.5*\Delta y$;

a current pixel mover coupled to said iteration control and said $dt(n)$ comparator wherein $dt(n)$ is determined by computing $dt(n) <= 0.5*\Delta y$ if the current pixel is moved down one pixel, and $dt(n) > 0.5*\Delta y$ if the current pixel moved to the left and down one pixel;

a $dt(n)$ corrector coupled to said iteration control and said $dt(n)$ comparator, and said $\Delta y$ determiner wherein $dt(n)$ is determined by computing $dt(n) = dt(n) - \Delta y$ if $dt(n) > 0.5*\Delta y$; and a $dt(n+1)$ computer coupled to said iteration control, said $dt(n)$ comparator, said $\Delta x$ determiner wherein $\Delta x$ is determined by computing $\Delta x = |x_e - x_s|$; $\Delta y$ is determined by computing $\Delta y = |y_e - y_s|$; and $dt(n+1)$ is determined by computing $dt(q+1) = dt(n) + \Delta x$; and said $\Delta y$ determiner.

10. An apparatus for rendering a line segment extending in the positive-x direction and positive-y direction with an absolute value of its slope between 0 and 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x = |x_e - x_s|$;

means for determining $\Delta y$ by computing $\Delta y = |y_e - y_s|$;

means for finding $dt(0) = (y_f*\Delta x) - (x_f*\Delta y)$, where $x_f$ is the fractional portion of $x_s$ and $y_f$ is the fractional portion of $y_s$;

for each column n containing a portion of said line segment:
means for plotting said current location if $dt(n) <= 0.5*\Delta x$ and plotting a pixel above said current location if $dt(n) > 0.5*\Delta x$;

means for moving said current location to the right one pixel if $dt(n) <= 0.5*\Delta x$ and moving said current location to the right and up one pixel if $dt(n) > 0.5*\Delta x$;

means for correcting $dt(n)$ by computing $dt(n) = dt(n) - \Delta x$ if $dt(n) > 0.5*\Delta x$; and means for computing $dt(n+1) = dt(n) + \Delta y$.

11. An apparatus for rendering a line segment extending in the negative-x direction and positive-y direction with an absolute value of its slope between 0 and 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x = |x_e - x_s|$;

means for determining $\Delta y$ by computing $\Delta y = |y_e - y_s|$;

means for finding $dt(0) = (y_f*\Delta x) - ((1-x_f)*\Delta y)$, where $x_f$ is the fractional portion of $x_s$ and $y_f$ is the fractional portion of $y_s$;

for each column n containing a portion of said line segment:
means for plotting said current location if $dt(n) <= 0.5*\Delta x$ and plotting a pixel above said current location if $dt(n) > 0.5*\Delta x$;

means for moving said current location to the left one pixel if $dt(n) <= 0.5*\Delta x$ and moving said current location to the left and up one pixel if $dt(n) > 0.5*\Delta x$;

means for correcting $dt(n)$ by computing $dt(n) = dt(n) - \Delta x$ if $dt(n) > 0.5*\Delta x$; and means for computing $dt(n+1) = dt(n) + \Delta y$.

12. An apparatus for rendering a line segment extending in the positive-x direction and negative-y direction with an absolute value of its slope between 0 and 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x = |x_c - x_s|$;

means for determining $\Delta y$ by computing $\Delta y = |y_e - y_s|$;

means for finding $dt(0) = ((1-y_f)*\Delta x) - (x_f*\Delta y)$, where $x_f$ is the fractional portion of $x_s$ and $y_f$ is the fractional portion of $y_s$;

for each column n containing a portion of said line segment:
means for plotting said current location if $dt(n) <= 0.5*\Delta x$ and plotting a pixel below said current location if $dt(n) > 0.5*\Delta x$;

means for moving said current location to the right one pixel if $dt(n)<=0.5*\Delta x$ and moving said current location to the right and down one pixel if $dt(n)>0.5*\Delta x$;

means for correcting $dt(n)$ by computing $dt(n)=dt(n)-\Delta x$ if $dt(n)>0.5*\Delta x$; and means for computing $dt(n+1)=dt(n)+\Delta y$.

13. An apparatus for rendering a line segment extending in the negative-x direction and negative-y direction with an absolute value of its slope between 0 and 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x=|x_e-x_s|$;

means for determining $\Delta y$ by computing $\Delta y=|y_e-y_s|$;

means for finding $dt(0)=((1-y_f)*\Delta x)-((1-x_f)*\Delta y)$, where $x_f$ is the fractional portion of $x_s$ and $y_f$ is the fractional portion of $y_s$;

for each column n containing a portion of said line segment:

means for plotting said current location if $dt(n)<=0.5*\Delta x$ and plotting a pixel below said current location if $dt(n)>0.5*\Delta x$;

means for moving said current location to the left one pixel if $dt(n)<=0.5*\Delta x$ and moving said current location to the left and down one pixel if $dt(n)>0.5*\Delta x$;

means for correcting $dt(n)$ by computing $dt(n)=dt(n)-\Delta x$ if $dt(n)>0.5*\Delta x$; and means for computing $dt(n+1)=dt(n)+\Delta y$.

14. An apparatus for rendering a line segment extending in the positive-x direction and positive-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $Y_e$ each having an integer portion and a fractional portion, the computer display having a current location initially set to a pixel containing the starting point, the apparatus including:

means for determining $\Delta x$ by computing $\Delta x=|x_e-x_s|$;

means for determining $\Delta y$ by computing $\Delta y=|y_e-y_s|$;

means for finding $dt(0)=(x_f*\Delta y)-(y_f*\Delta x)$, where $x_f$ is the fractional portion of $x_s$ and $y_f$ is the fractional portion of $y_s$;

for each row r containing a portion of said line segment:

means for plotting said current location if $dt(n)<=0.5*\Delta y$ and plotting a pixel to the right of said current location if $dt(n)>0.5*\Delta y$;

means for moving said current location up one pixel if $dt(n)<=0.5*\Delta y$ and moving said current location to the right and up one pixel if $dt(n)>0.5*\Delta y$;

means for correcting $dt(n)$ by computing $dt(n)=dt(n)-\Delta y$ if $dt(n)>0.5*\Delta y$; and means for computing $dt(n+1)=dt(n)+\Delta x$.

15. An apparatus for rendering a line segment extending in the negative-x direction and positive-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x=|x_e-x_s|$;

means for determining $\Delta y$ by computing $\Delta y=|y_e-y_s|$;

means for finding $dt(0)=((1-x_f)*\Delta y)-(y_f*\Delta x)$, where $x_f$ is the fractional portion of $x_s$ and $y_f$ is the fractional portion of $y_s$;

for each row r containing a portion of said line segment:

means for plotting said current location if $dt(n)<=0.5*\Delta y$ and plotting a pixel to the left of said current location if $dt(n)>0.5*\Delta y$;

means for moving said current location up one pixel if $dt(n)<=0.5*\Delta y$ and moving said current location to the left and up one pixel if $dt(n)>0.5*\Delta y$;

means for correcting $dt(n)$ by computing $dt(n)=dt(n)-\Delta x$ if $dt(n)>0.5*\Delta y$; and means for computing $dt(n+1)=dt(n)+\Delta x$.

16. An apparatus for rendering a line segment extending in the positive-x direction and negative-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x=|x_e-x_s|$;

means for determining $\Delta y$ by computing $\Delta y=|y_e-y_s|$;

means for finding $dt(0)=(x_f*\Delta y)-((1-y_f)*\Delta x)$, where $x_f$ is the fractional portion of $x_s$ and $y_f$ is the fractional portion of $y_s$;

for each row r containing a portion of said line segment:

means for plotting said current location if $dt(n)<=0.5*\Delta y$ and plotting a pixel to the right of said current location if $dt(n)>0.5*\Delta y$;

means for moving said current location down one pixel if $dt(n)<=0.5*\Delta y$ and moving said current location to the right and down one pixel if $dt(n)>0.5*\Delta y$;

means for correcting $dt(n)$ by computing $dt(n)=dt(n)-\Delta y$ if $dt(n)>0.5*\Delta y$; and means for computing $dt(n+1)=dt(n)+\Delta x$.

17. An apparatus for rendering a line segment extending in the negative-x direction and negative-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the apparatus including:

means for determining $\Delta x$ by computing $\Delta x=|x_e-x_s|$;

means for determining $\Delta y$ by computing $\Delta y=|y_e-y_s|$;

means for finding $dt(0)=((1-x_f)*\Delta y)-((1-y_f)*\Delta x)$, where $x_f$ is the fractional portion of $x_s$ and $y_f$ is the fractional portion of $y_s$;

for each row r containing a portion of said line segment:

means for plotting said current location if $dt(n)<=0.5*\Delta y$ and plotting a pixel to the left of said current location if $dt(n)>0.5*\Delta y$;

means for moving said current location down one pixel if $dt(n)<=0.5*\Delta y$ and moving said current location to the left and down one pixel if $dt(n)>0.5*\Delta y$;

means for correcting $dt(n)$ by computing $dt(n)=dt(n)-\Delta y$ if $dt(n)>0.5*\Delta y$; and means for computing $dt(n+1)=dt(n)+\Delta x$.

18. A program storage device readable by a machine, tangibly embodying a program of instructions executable by the machine for rendering a line segment extending in the positive-x direction and positive-y direction with an absolute value of its slope between 0 and 1 on a computer display given a starting point and an ending point, the starting point having the form ($x_s$, $y_s$) and the ending point having the form ($x_e$, $y_e$), $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = (y_f * \Delta x) - (x_f * \Delta y)$, where $x_f$ is the fractional portion of $x_s$ and $y_f$ is the fractional portion of $y_s$;

for each column n containing a portion of said line segment:

plotting said current location if $dt(n) <= 0.5*\Delta x$ and plotting a pixel above said current location if $dt(n) > 0.5*\Delta x$;

moving said current location to the right one pixel if $dt(n) <= 0.5*\Delta x$ and moving said current location to the right and up one pixel if $dt(n) > 0.5*\Delta x$;

correcting $dt(n)$ by computing $dt(n) = dt(n) - \Delta x$ if $dt(n) > 0.5*\Delta x$; and computing $dt(n+1) = dt(n) + \Delta y$.

19. A program storage device readable by a machine, tangibly embodying a program of instructions executable by the machine for rendering a line segment extending in the negative-x direction and positive-y direction with an absolute value of its slope between 0 and 1 on a computer display given a starting point and an ending point, the starting point having the form ($x_s$, $y_s$) and the ending point having the form ($x_e$, $y_e$), $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = (y_f * \Delta x) - ((1-x_f) * \Delta y)$, where $x_f$ is the fractional portion of $x_s$ and $y_f$ is the fractional portion of $y_s$;

for each column n containing a portion of said line segment:

plotting said current location if $dt(n) <= 0.5*\Delta x$ and plotting a pixel above said current location if $dt(n) > 0.5*\Delta x$;

moving said current location to the left one pixel if $dt(n) <= 0.5*\Delta x$ and moving said pixel to the left and up one pixel if $di(n) > 0.5*\Delta x$;

correcting $dt(n)$ by computing $dt(n) = dt(n) - \Delta x$ if $dt(n) > 0.5*\Delta x$; and computing $dt(n+1) = dt(n) + \Delta y$.

20. A program storage device readable by a machine, tangibly embodying a program of instructions executable by the machine for rendering a line segment extending in the positive-x direction and negatively direction with an absolute value of its slope between 0 and 1 on a computer display given a starting point and an ending point, the starting point having the form ($x_s$, $y_s$) and the ending point having the form ($x_e$, $y_e$), $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = ((1-y_f) * \Delta x) - (x_f * \Delta y)$, where xf is the fractional portion of $x_s$ and $y_f$ is the fractional portion of $y_s$;

for each column n containing a portion of said line segment:

plotting said current location if $dt(n) <= 0.5*\Delta x$ and plotting a pixel below said current location if $dt(n) > 0.5*\Delta x$;

moving said current location to the right one pixel if $dt(n) <= 0.5*\Delta x$ and moving said current location to the right and down one pixel if $dt(n) > 0.5*\Delta x$;

correcting $dt(n)$ by computing $dt(n) = dt(n) - \Delta x$ if $dt(n) > 0.5*\Delta x$; and computing $dt(n+1) = dt(n) + \Delta y$.

21. A program storage device readable by a machine, tangibly embodying a program of instructions executable by the machine for rendering a line segment extending in the negative-x direction and negative-y direction with an absolute value of its slope between 0 and 1 on a computer display given a starting point and an ending point, the starting point having the form ($x_s$, $y_s$) and the ending point having the form ($x_e$, $y_e$), $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = ((1-y_f) * \Delta x) - ((1-x_f) * \Delta y)$, where $x_f$ is the fractional portion of $x_s$ and $y_f$ is the fractional portion of $y_s$;

for each column n containing a portion of said line segment:

plotting said current location if $dt(n) <= 0.5*\Delta x$ and plotting a pixel below said current location if $dt(n) > 0.5*\Delta x$;

moving said current location to the left one pixel if $dt(n) <= 0.5*\Delta x$ and moving said current location to the left and down one pixel if $dt(n) > 0.5*\Delta x$;

correcting $dt(n)$ by computing $dt(n) = dt(n) - \Delta x$ if $dt(n) > 0.5*\Delta x$; and computing $dt(n+1) = dt(n) + \Delta y$.

22. A program storage device readable by a machine, tangibly embodying a program of instructions executable by the machine for rendering a line segment extending in the positive-x direction and positive-y direction with an absolute value of its slope greater than 1 on a computer display given a starting point and an ending point, the starting point having the form ($x_s$, $y_s$) and the ending point having the form ($x_e$, $y_e$), $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$; finding $dt(0) = (x_f * \Delta y) - (y_f * \Delta x)$, where $x_f$ is the fractional portion of $x_s$ and $y_f$ is the fractional portion of $y_s$;

for each row r containing a portion of said line segment:

plotting said current location if $dt(n) <= 0.5*\Delta y$ and plotting a pixel to the right of said current location if $dt(n) > 0.5*\Delta y$;

moving said current location up one pixel if $dt(n) <= 0.5*\Delta y$ and moving said current location to the right and up one pixel if $dt(n) > 0.5*\Delta y$; and correcting $dt(n)$ by computing $dt(n) = dt(n) - \Delta y$ if $dt(n) > 0.5*\Delta y$; and computing $dt(n+1) = dt(n) + \Delta x$.

23. A program storage device readable by a machine, tangibly embodying a program of instructions executable by the machine for rendering a line segment extending in the negative-x direction and positive-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = ((1-x_f)*\Delta y) - (y_f*\Delta x)$, where $x_f$ is the fractional portion of $x_s$ and $y_f$ is the fractional portion of $y_s$;

for each row r containing a portion of said line segment:

plotting said current location if $dt(n) <= 0.5*\Delta y$ and plotting a pixel to the left of said current location if $dt(n) > 0.5*\Delta y$;

moving said current location up one pixel if $dt(n) <= 0.5*\Delta y$ and moving said current location to the left and up one pixel if $dt(n) > 0.5*\Delta y$;

correcting $dt(n)$ by computing $dt(n) = dt(n) - \Delta y$ if $dt(n) > 0.5*\Delta y$; and computing $dt(n+1) = dt(n) + \Delta x$.

24. A program storage device readable by a machine, tangibly embodying a program of instructions executable by the machine for rendering a line segment extending in the positive-x direction and negative-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = (x_f*\Delta y) - ((1-y_f)*\Delta x)$, where $x_f$ is the fractional portion of $x_s$ and $y_f$ is the fractional portion of $y_s$;

for each row r containing a portion of said line segment:

plotting said current location if $dt(n) <= 0.5*\Delta y$ and plotting a pixel to the right of said current location if $dt(n) > 0.5*\Delta y$;

moving said current location down one pixel if $dt(n) <= 0.5*\Delta y$ and moving said current location to the right and down one pixel if $dt(n) > 0.5*\Delta y$;

correcting $dt(n)$ by computing $dt(n) = dt(n) - \Delta y$ if $dt(n) > 0.5*\Delta y$; and computing $dt(n+1) = dt(n) + \Delta x$.

25. A program storage device readable by a machine, tangibly embodying a program of instructions executable by the machine for rendering a line segment extending in the negative-x direction and negative-y direction with an absolute value of its slope greater than 1 on a computer display given a starting point and an ending point, the starting point having the form $(x_s, y_s)$ and the ending point having the form $(x_e, y_e)$, $x_s$, $y_s$, $x_e$, $y_e$ each having an integer portion and a fractional portion, the computer display having a current location initially set to a pixel containing the starting point, the method including:

determining $\Delta x$ by computing $\Delta x = |x_e - x_s|$;

determining $\Delta y$ by computing $\Delta y = |y_e - y_s|$;

finding $dt(0) = ((1-x_f)*\Delta y) - ((1-y_f)*\Delta X)$, where $x_f$ is the fractional portion of $x_s$ and $y_f$ is the fractional portion of $y_s$;

for each row r containing a portion of said line segment:

plotting said current location if $dt(n) <= 0.5*\Delta y$ and plotting a pixel to the left of said current location if $dt(n) > 0.5*\Delta y$;

moving said current location down one pixel if $dt(n) <= 0.5*\Delta y$ and moving said current location to the left and down one pixel if $dt(n) > 0.5*\Delta y$;

correcting $dt(n)$ by computing $dt(n) = dt(n) - \Delta y$ if $dt(n) > 0.5*\Delta y$; and computing $dt(n+1) = dt(n) + \Delta x$.

* * * * *

UNITED STATES PATENT AND TRADEMARK OFFICE
CERTIFICATE OF CORRECTION

PATENT NO.    : 6,583,788 B1
DATED         : June 24, 2003
INVENTOR(S)   : Gunawan Ali-Santosa It is certified that error appears in the above-identified patent and that said Letters Patent is hereby corrected as shown below:

Column 2,
Line 29, replace "$P_{k+1}-P_k=2\Delta y(x_{k+1}-x_k)-2\Delta x(y_{k+1}-Y_k)$" with
-- $P_{k+1}-P_k=2\Delta y(x_{k+1}-x_k)-2\Delta x(y_{k+1}-y_k)$ --.
Line 33, replace "$Y_{k+1}+Y_k$" with -- $y_{k+1}+y_k$ --.
Line 54, replace "$p_o 2\Delta y-\Delta x$" with -- $p_o=2\Delta y-\Delta x$ --.
Line 59, replace "$Y_k$" with -- $y_k$ --.

Column 3,
Lines 15, 52 and 61, replace "positively" with -- positive-y --.

Column 4,
Line 49, replace "negatively" with -- negative-y --.

Column 6,
Line 34, replace "*dt" with -- dt --.

Column 7,
Line 32, replace "negatively" with -- negative-y --.
Line 38, replace "$\Delta x=x_e - |x_s|$" with -- $\Delta x=|x_e - x_s|$ --.

Column 8,
Line 20, replace "positively" with -- positive-y --.
Line 52, replace "$\Delta x=|x_e - x_s 51|$" with -- $\Delta x=|x_e - x_s|$ --.

Column 9,
Lines 3 and 28, replace "negatively" with -- negative-y --.
Line 64, replace "x" with -- $x_f$ --.

Column 12,
Line 11, replace "$dt(n)<=0.5\Delta y$" with -- $dt(n)<=0.5*\Delta y$ --.

Column 13,
Lines 38, 39 and 62, remove "and said $\Delta y$ determiner"
Lines 35 and 59, between "determiner" and "wherein" insert
-- and said $\Delta y$ determiner --.
Line 62, replace "$dt(q+1)=dt(n)+\Delta x$" with -- $dt(n+1)=dt(n)+\Delta x$ --.

UNITED STATES PATENT AND TRADEMARK OFFICE
CERTIFICATE OF CORRECTION

PATENT NO. : 6,583,788 B1
DATED : June 24, 2003
INVENTOR(S) : Gunawan Ali-Santosa It is certified that error appears in the above-identified patent and that said Letters Patent is hereby corrected as shown below:

Column 17,
Line 55, replace "negatively" with -- negative-y --.

Signed and Sealed this

Twenty-third Day of December, 2003

JAMES E. ROGAN
*Director of the United States Patent and Trademark Office*